United States Patent Office 3,766,282
Patented Oct. 16, 1973

3,766,282
1-(1-ALKENYL) BICYCLO(1.1.0)BUTANES AND
THEIR HOMOPOLYMERS
James B. Sieja, Wilmington, Del., assignor to E. I. du
Pont de Nemours and Company, Wilmington, Del.
No Drawing. Original application Jan. 27, 1970, Ser. No.
6,284, now Patent No. 3,661,875. Divided and this
application Apr. 14, 1971, Ser. No. 134,085
Int. Cl. C07c 23/00, 23/06
U.S. Cl. 260—666 PY               8 Claims

ABSTRACT OF THE DISCLOSURE

Disclosed herein are bicyclobutanes of the formula

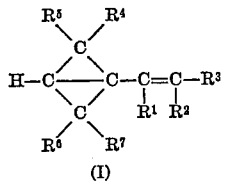

wherein $R^1$, $R^2$, $R^3$, $R^4$, $R^5$, $R^6$, and $R^7$ may be hydrogen or a hydrocarbyl group of 1–18 carbon atoms which is free of olefinic or acetylenic unsaturation, with the provisco that the pairs $R^1$ and $R^2$, $R^2$ and $R^3$, $R^4$ and $R^5$, and $R^6$ and $R^7$ taken together may, respectively, be tetramethylene or pentamethylene diradicals. The above compounds are prepared by treating 3-alkoxycyclobutanone with a 1-alkenyl Grignard reagent to obtain the corresponding 1-alkenyl-3-alkoxy-1-hydroxycyclobutane which is treated with a hydrogen halide to form a mixture of 1-alkenyl-3-alkoxy-1-halocyclobutane and 3-alkoxy-1-(2-haloalkenylidene)cyclobutane. Those compounds are then treated with a metal capable of removing halogen (such as sodium, magnesium, zinc, etc.) to obtain the corresponding 1-(1-alkenyl)bicyclo[1.1.0]butane. These bicyclobutanes can be converted to homopolymers, which are useful as self-supporting films, fibers and molding powder.

CROSS-REFERENCE TO RELATED APPLICATION

This application is a division of copending application Ser. No. 6,284, filed on Jan. 27, 1970, now U.S. Pat. No. 3,661,875, issued May 9, 1972.

BACKGROUND OF THE INVENTION

Field of the invention

This invention is concerned with a new class of polymerizable organic compounds, and more particularly with the 1-(1-alkenyl)bicyclo[1.1.4]butanes and their homopolymers.

Description of the prior art

New polymerizable monomers with more than one polymerizable site in a single molecule have long been of interest for the potential rubbery properties of their polymers and the capacity of the polymers to be cured and crosslinked. The present invention concerns a new type of monomer polymerizable at two sites within the molecule and the homopolymers obtained therefrom.

SUMMARY OF THE INVENTION

According to the present invention there are provided 1-(1-alkenyl)bicyclo[1.1.0]butanes of the formula

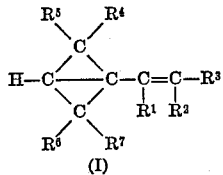

in which $R^1$, $R^2$, $R^3$, $R^4$, $R^5$, $R^6$ and $R^7$ may be hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals ($-CH_2)_4-$ or $-(CH_2)_5-$).

According to the present invention there is also provided a process for preparing 1-(1-alkenyl)-bicyclo [1.1.0]butanes comprising (1) contacting 3-alkoxycyclobutanone with a 1-alkenyl Grignard reagent at about 0° C.–100° C. under anhydrous conditions and adding aqueous mineral acid to the resulting reaction mixture to obtain the corresponding 1-alkenyl-3-alkoxy-1-hydroxycyclobutane;

(2) contacting said 1-alkenyl-3-alkoxy-1-hydroxycyclobutane with a hydrogen halide at about 0° C.–50° C. to form a mixture of 1-alkenyl-3-alkoxy-1-halocyclobutane and 3-alkoxy-1-(2-haloalkenylidene)cyclobutane;

(3) contacting said 1-alkenyl-3-alkoxy-1-halocyclobutane and/or 3-alkoxy-1-(2-haloalkenylidene)cyclobutane at about 0° C.–100° C. with a metal capable of removing halogen to obtain the corresponding 1-(1-alkenyl)-bicyclo[1.1.0]butane.

Further, according to the present invention the bicyclobutane monomers can be converted to homopolymers with the aid of free radical, cationic, anionic and coordination-type polymerization catalysts.

The use of the phrase "consisting essentially of" does not exclude unspecified conditions or materials which do not prevent the advantages of the present invention from being realized.

DETAILS OF THE INVENTION

The 1-(1-alkenyl)bicyclo[1.1.0]butane monomers of this invention may be represented by the formula

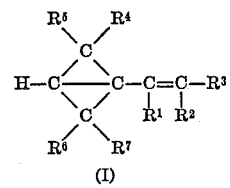

in which $R^1$, $R^2$, $R^3$, $R^4$, $R^5$, $R^6$, and $R^7$ are alike or different and may be hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals ($-CH_2)_4-$ or $-(CH_2)_5-$).

In defining the terms $R^1$ to $R^7$ above, the term "hydrocarbyl free of ethylenic and acetylenic carbon-to-carbon unsaturation" includes those hydrocarbyl groups which do not contain aliphatic double or triple bonds. Thus, the hydrocarbyl groups as defined herein include alkyl, cycloalkyl, aralkyl, alkaryl, and aryl. Illustrative hydrocarbyl groups as defined hereinabove include alkyl groups, such as methyl, ethyl, t-butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl, and the like; aryl groups such as phenyl, naphthyl, anthryl, p-phenylphenyl, p-biphenylphenyl, naphthacenyl benzanthryl, chrysenyl, and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenylethyl, diphenylmethyl, α-naphthylethyl, 2-(2-anthryl)ethyl, 4-(2-anthryl)butyl, and the like. Preferred herein are hydrocarbyl groups containing 1–12 carbon atoms, and particularly those containing 1–6 carbon atoms.

Compounds of Formula I are prepared by the following steps: A 3-alkoxycyclobutanone (II) is treated with a 1-alkenyl Grignard reagent (III) to obtain the corresponding 1-alkenyl-3-alkoxy-1-hydroxycyclobutane (IV). This compound is treated with a hydrogen halide to form a mixture of a 1-alkenyl-3-alkoxy-1-halocyclobutane (V) and a 3-alkoxy-1-(2-haloalkenylidene)cyclobutane (VI). Compound V and/or Compound VI is then treated with a metal capable of removing halogen (such as sodium, magnesium, zinc, or the like) to obtain the corresponding 1-(1-alkenyl)bicyclo[1.1.0]butane of Formula I.

This process may be summarized as follows:

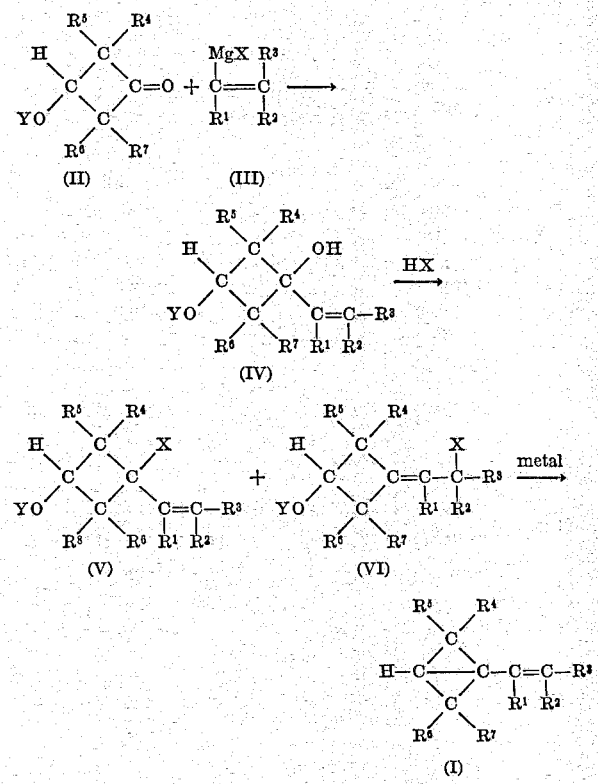

in which the R's are defined as above, X is chlorine, bromine, or iodine and Y is a lower alkyl group, particularly a saturated alkyl group having six or fewer carbon atoms.

The 3-alkoxycyclobutanones of Formula II are prepared by the reaction of the appropriate ketene (XV) with the appropriate 1-alkenyl ether (XVI) as follows:

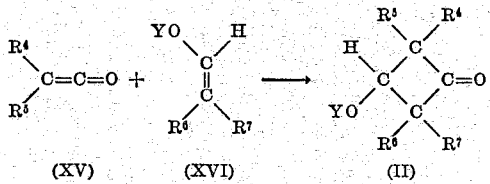

This reaction is carried out according to the procedure of R. H. Hasek et al., J. Org. Chem. 29, 1239–41 (1964).

Compounds of Formula II in which any or all of $R^4$, $R^5$, $R^6$, and/or $R^7$ are hydrogen may be further substituted by treatment with a hydrocarbyl iodide and sodium hydride to insert the hydrocarbyl group as $R^4$, $R^5$, $R^6$, and/or $R^7$.

The reaction of a 3-alkoxycyclobutanone of Formula II with a 1-alkenyl Grignard reagent of Formula III to form a 3-alkoxy-1-alkenyl-1-hydroxycyclobutane of Formula IV as shown above is preferably carried out as follows: The Grignard reagent is freshly prepared by treating the corresponding halide of formula $CR^2R^3=CR^1X$ with at least one molecular equivalent of magnesium metal under anhydrous conditions and in the presence of an inert organic solvent such as diethyl ether, dibutyl ether, tetrahydrofuran, and the like. A small amount of a Grignard activating agent may be added if needed to start the reaction. To the resulting Grignard solution is added gradually the 3-alkoxycyclobutanone of Formula II, the temperature being maintained in the range of 0° to 100° C., and preferably from 0° to 50° C. The resulting reaction mixture is treated with aqueous mineral acid. The organic phase is separated and dried and the 1-alkenyl-3-alkoxy-1-hydroxycyclobutane of Formula IV is recovered by known means, such as distillation.

The 1-alkenyl-3-alkoxy-1-hydroxycyclobutane of Formula IV is then dissolved in an inert hydrocarbon (pentane, cyclohexane, etc.) and agitated with a chemical excess of concentrated aqueous hydrochloric, hydrobromic or hydroiodic acid for a period from 1 minute to 1 hour or more. This reaction is carried out in the temperature range between 0° C. and 50° C. and preferably at room temperature. The organic phase is then washed with water, separated and dried. The resulting 1-alkenyl-3-alkoxy-1-halocyclobutane of Formula V and 3-alkoxy-1-(2-haloalkenylidene)cyclobutane of Formula VI are recovered either separately or as a mixture by known means such as distillation.

The 1-alkenyl-3-alkoxy-1-halocyclobutane of Formula V and/or the 3-alkoxy-1-(2-haloalkenylidene)cyclobutane of Formula VI are treated with at least a slight chemical excess of a metal of the type capable of removing halogen. Suitable metals are those of Groups I–A, I–B, II–A, and II–B of the Deming Periodic Table, e.g., Li, Na, K, Rb, Cs, Mg, Ca, Sr, Ba, Cu, Ag, Zn, Cd, Hg, and the like. The reaction may be carried out neat or in the presence of an organic solvent which is inert to the reactants and products. Suitable solvents are hydrocarbons such as pentane and hexane, and ethers such as diethyl ether and tetrahydrofuran. The reaction is preferably carried out in the temperature range from 0° to 100° C. and may require from a few minutes to several days to yield substantial quantities of the 1-(1-alkenyl)bicyclo[1.1.0]butane monomer of Formula I. This latter product is recovered by known means, such as distillation. During the recovery step it may be desirable to employ small quantities of a known inhibitor of vinyl polymerization to prevent premature polymerization of the alkenylbicyclobutane product.

Optionally, the above process for preparing 1-(1-alkenyl)bicyclo[1.1.0]butane may be carried out without separately isolating each intermediate.

Compounds of Formula I are readily converted to their homopolymers by the action of free radical, anionic, cationic or coordination-type polymerization catalysts.

The homopolymers of this invention as first formed may contain any or all of the chain units:

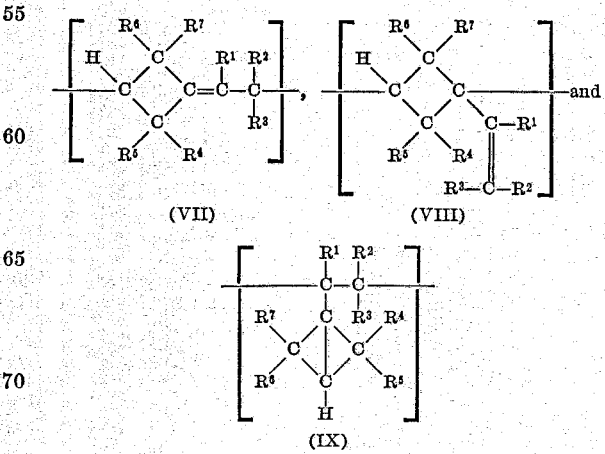

Such units contain catenarian or side-chain double bonds or side-chain bicyclo[1.1.0]butane rings which are sites for further polymerization (i.e., chain branching) or for crosslinking by reaction with crosslinking agents.

Homopolymers may be represented by a structure having $n$ units of Formulas VII, VIII and/or IX, where $n$ is greater than 4.

For preparing the homopolymers of this invention, the free-radical-generating initiators may be selected from a wide variety of compounds representative of this type of initiator. Included are the azo initiators, e.g., $\alpha,\alpha'$-azodiisobutyronitrile, 1,1' - azodicyclohexanecarbonitrile, dimethyl $\alpha,\alpha'$-azodiisobutyrate and $\alpha,\alpha'$-azodiisobutyramide, and the organic peroxides and hydroperoxides, e.g., dibenzoyl peroxide, di-t-butyl peroxide, and t-butyl hydroperoxide. The initiators can be used in proportions ranging from 0.01 to 10 weight percent of the monomer or comonomers being polymerized. Other sources of free radicals for initiating polymerization may also be used such as electron bombardment, ultraviolet light in the presence of a sensitizer, and the like.

Suitable solvents and/or dispersion media for free-radical polymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. It is not essential that a solvent or dispersion medium be used, and bulk polymerizations can be carried out.

A wide variety of anionic initiators are operable herein for polymerization. Representative anionic initiators that can be used include the alkali metal alkyls, e.g., n-butyllithium and methyllithium; the alkali metal alkoxides, e.g., potassium t-butoxide and sodium methoxide; and the alkali metal aryls, e.g., sodium naphthalene. The concentration of anionic initiator employed can range from 0.01 to 10 weight percent of the monomer or monomers being polymerized. The order of addition of the monomer and the initiator is not critical.

Suitable reaction media for anionic polymerization include ethers, e.g., diethyl ether, tetrahydrofuran, and the dimethyl ether of ethylene glycol; hydrocarbons, e.g., benzene and hexane; chlorinated hydrocarbons, e.g., chlorobenzene; and amides, e.g., dimethylformamide. The ethers are preferred. However, the polymerization can also be carried out in the absence of solvents.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride, and the like. The concentration of initiator may be from 0.01 to 10 weight percent of the monomer or monomers being polymerized.

Coordination-type initiators usually involve a combination of a lower valent transition metal chloride with an organometallic compound. Specific combinations which are useful include diisobutylaluminum chloride with vanadium tris(acetylacetonate), diisobutylaluminum chloride with vanadium oxychloride, triisobutylaluminum with titanium tetrachloride, methylmagnesium bromide with titanium tetrachloride, lithium aluminumtetradecyl with titanium tetrachloride, and the like. The concentration of initiator may be from 0.01–10 weight percent of the monomer or monomers being polymerized.

Whereas they are not essential, preferred reaction media for carrying out polymerizations initiated by cationic-type or coordination-type catalysts are the hydrocarbons, particularly aliphatic hydrocarbons such as hexane and cyclohexane and the halogenated hydrocarbons such as tetrachloroethylene.

Selection of the particular polymerization initiator is influenced, at least in part, by the nature of the monomers to be polymerized. The proper matching of the disclosed monomers and catalysts is well within the knowledge of one skilled in the art. Free radical initiators are preferred.

Selection of the reaction temperature depends largely upon the particular initiator being used. Some cationic initiators work well at $-80°$ C. Some peroxides work well above 190° C. Generally, a temperature range of about $-100°$ C.$-200°$ C. is suitable, however, the full range would not apply to any one of the types of initiators recited. Reaction temperatures between about $-20°$ C. and 60° C. are preferred.

Reaction times can vary from a few seconds, (i.e., 5) to several days, e.g., 2 to 3 days or more depending on the particular monomers, initiator, solvent, and reaction temperature employed.

Pressures above and below atmospheric pressure are operable. Atmospheric and superatmospheric pressures are preferred.

DESCRIPTION OF THE PREFERRED EMBODIMENTS

The examples which follow are meant to illustrate but not to limit the invention. In the examples, all parts and percentages are by weight unless otherwise specified.

EXAMPLE 1

Part A.—1-hydroxy-1-vinyl-3-ethoxycyclobutane

To 14.5 parts of magnesium turnings was added 350 parts of dry tetrahydrofuran and 1 part of 1,2-dibromoethane. The solution was heated at 50° C. to activate the magnesium and then cooled to 25° C. While maintaining the temperature at 25–35° C., 80 parts of vinyl bromide was bubbled into the solution over 2 hours. After all the magnesium had dissolved, the solution was cooled. To the solution was added at 0° C. to 10° C. over 1 hour 57 parts of 3-ethoxycyclobutanone in 42 parts of dry tetrahydrofuran. The mixture was stirred at 25° C. for 1 hour, cooled, and acidified with 50% hydrochloric acid solution. The layers were separated, and 200 parts of water were added to the lower water layer. The water was then extracted five times with 70-part portions of ether, which was then combined with the original tetrahydrofuran layer. The organic phase was washed with 100 parts of saturated sodium bicarbonate solution, 100 parts of saturated sodium chloride solution, and then dried over magnesium sulfate. The solvent was removed, and the residue was distilled to give 50 parts of 1-hydroxy-1-vinyl-3-ethoxycyclobutane, B.P. 46° C./0.35 mm. The infrared and NMR spectra were consistent with the proposed structure.

*Analysis.*—Calcd. for $C_8H_{14}O_2$ (percent): C, 67.57; H, 9.92. Found (percent): C, 66.57, 66.23; H, 10.10, 10.08.

Part B.—1-chloro-1-vinyl-3-ethoxycyclobutane and 1-(2-chloroethylidene)-3-ethoxycyclobutane In a separatory funnel was placed 60 parts of pentane, 24.6 parts of 1-hydroxy-1-vinyl-3-ethoxycyclobutane, and 75 parts of concentrated aqueous hydrochloric acid. The mixture was shaken for 5 minutes, and the layers were separated. The aqueous phase was washed with 15 parts of pentane and then poured into 300 parts of ice water. This was extracted 3 times with 30-part portions of pentane. The combined organic phase was washed four times with 150-part portions of ice water, 100 parts of saturated sodium chloride solution, and then dried. Removal of solvent and fractional distillation gave 3.7 parts of 1-chloro 1-vinyl-3-ethoxycyclobutane, B.P. 43° C./2.7 mm., $n_D^{25}=1.4532$.

*Analysis.*—Calcd. for $C_8H_{13}OCl$ (percent): C, 59.82; H, 8.16; Cl, 22.08. Found (percent): C, 59.78; H, 8.36; Cl, 22.29.

The second cut contained 9.3 parts of 1-(2-chloroethylidene) - 3 - ethoxycyclobutane, B.P. 66° C./2.7 mm., $n_D^{25}=1.4743$.

*Analysis.*—Found (percent): C, 59.52; H, 8.30; Cl. 21.19 (21.92 rerun).

The infrared and NMR spectra were consistent with the proposed structures.

Part C.—1-vinylbicyclobutane

To 30 parts of magnesium turnings in 1000 parts of refluxing ether was added over 23 hours 161 parts of 1-(2-chloroethylidene)-3-ethoxycyclobutane. All volatile material was then removed under reduced pressure. Small amounts of phenothiazine and phenyl-β-naphthylamine were added to the volatiles which were then distilled. About 20 parts of 1-vinylbicyclobutane was obtained, B.P. 41° C./275 mm. The infrared, NMR, and UV spectra were consistent with the proposed structure.

*Analysis.*—Calcd. for $C_6H_8$ (percent): C, 89.94; H, 10.06. Found (percent): C, 88.82, 88.75; H, 9.32, 10.02.

EXAMPLE 2

Homopolymer of 1-vinylbicyclobutane

A sample of 1-vinylbicyclobutane containing a small amount of α,α'-azodiisobutyronitrile was heated in a sealed glass tube at 60° C. for 2 days. The solid rubbery plug was removed from the tube, dissolved in hexane, and precipitated from methanol to give crumbs of rubbery polymer. On standing, the polymer cured and became harder, presumably through cross-linking by reaction with oxygen of the air.

EXAMPLE 3

In a glass reactor and under a nitrogen atmosphere, a mixture of 1.6 ml. of 1-vinylbicyclobutane, 0.10 g. of α,α'-azodiisobutyronitrile, 10 ml. of 10% aqueous soap solution and 0.2 ml. of isobutyraldehyde was agitated at 70° C. for 16 hours. While still under nitrogen, the reaction mixture was agitated with 50 ml. of saturated aqueous KCl and the coagulated solid polymer was filtered off. It was washed thoroughly with water and dried to give 1.24 g. of rubbery solid. This was dissolved in chloroform to yield a polymer solution suitable for film-casting, etc., see Example B below. The polymer was recovered from chloroform solution by drowning in methanol. It was filtered, still under nitrogen, and dried to give 0.50 g. of rubbery polymer. After this was exposed to air for a few hours it was no longer soluble in chloroform, showing it had become crosslinked.

Utility

The homopolymers of this invention are useful in the form of self-supporting film for wrapping and packaging, in the form of fibers for clothing fabrics, and in molded form for durable cups, boxes and containers of various descriptions.

EXAMPLE A

A freshly prepared hexane solution of 1-vinylbicyclobutane as described in Example 2 above can be made into a clear rubbery film by casting it on a flat surface under a doctor blade and evaporating the hexane. Upon contact with air, this film cures rapidly by crosslinking to a stiff self-supporting film useful for wrapping, packaging and the like.

Fibers can be made from the hexane solution by conventional dry spinning techniques. The fibers initially produced are elastic but after air-drying they become crosslinked and become stiff and strong and no longer soluble in hexane. Air drying and crosslinking usually takes less than 12 hours. Fibers can be used in wearing apparel or can be molded, for example, into durable containers of various sizes and descriptions.

One method for molding is to pack the solvent-damp and not yet completely crosslinked fibers (or crumbs, pieces, etc.) into suitable molds of the desired shapes under pressure followed by drying and crosslinking.

EXAMPLE B

A freshly prepared chloroform solution of 1-vinylbicyclobutane as described in Example 3 is suitable for forming film, fibers and molded articles generally as described in Example A above.

Discussion of the table

Other 1-(1-alkenyl)bicyclo[1.1.0]butanes are prepared as summarized in the table below. Known ketenes, shown in column A, and alkenyl ethers, shown in column B, are substituted in the procedures of Hasek et al. noted above to obtain the 3-alkoxycyclobutanones of Formula II shown in column C. These latter compounds are then treated by the procedure of Example 1, Part A, with Grignard reagents prepared from the halides shown in column D to obtain the 1-alkenyl-3-alkoxy-1-hydroxycyclobutanes of Formula IV shown in column E. These in turn are substituted for 3-ethoxy-1-hydroxy-1-vinylcyclobutane in the procedures of Example 1, Parts B and C to obtain the 1-(1-alkenyl)bicyclo[1.1.0]butanes of Formula I shown in column F. These 1-(1-alkenyl)bicyclo[1.1.0]butanes are converted to their homopolymers by employing the procedures of Examples 2 and 3 as well as the other initiating systems described above.

Ethyl β-octadecylvinyl ether for use in item 14 of the table is prepared by treating eicosanal with ethanol in the presence of an acidic catalyst to obtain the corresponding diethyl acetal. The acetal is treated with a strong acid to split out ethanol and yield ethyl β-octadecylvinyl ether.

TABLE

| Item | A. Ketene | B. 1-Alkenyl Ether | C. 3-Alkoxycyclobutanone |
|---|---|---|---|
| 1 | $H_3C-H_2C$, $CH_2-CH_3$, C, C=O | $H_3C-O$, H, C, C, $H_3C$, $CH_3$ | $H_3C-H_2C$, $CH_2-HC_3$, H, =O, $H_3C-O$, $H_3C$, $CH_3$ |
| 2 | (phenyl), $CH_3$, C, C=O | $H_3C-H_2C-O$, H, C, C, $H_3C-H_2C$, H | (phenyl), $CH_3$, H, =O, $H_3C-H_2C-O$, $H_3C-H_2C$, H |
| 3 | (phenyl)(phenyl), C, C=O | $H_3C-O$, H, C, C, H, (phenyl) | (phenyl)(phenyl), H, =O, $H_3C-O$, H, (phenyl) |

3,766,282

TABLE—Continued

| Item | A. Ketene | B. 1-Alkenyl Ether | C. 3-Alkoxycyclobutanone |
|---|---|---|---|
| 4 | (structure: H₂C—(CH₂)₅—H₂C and CH₂—(CH₂)₅—CH₃ on C=C=O) | (structure: H₃C—O on C=C with H₃C—H₂C and CH₂—CH₃) | (3-alkoxycyclobutanone with H₂C—(CH₂)₅—H₂C, CH₂—(CH₂)₅—CH₃, H₃C—O, H₃C—H₂C, CH₂—CH₃) |
| 5 | (structure: phenyl-H₂C and CH₂-phenyl on C=C=O) | (structure: H₃C—O on C=C with H₃C—(CH₂)₄—H₂C and H) | (3-alkoxycyclobutanone with benzyl, benzyl, H₃C—O, H₃C—(CH₂)₄—H₂C, H) |
| 6 | (structure: mesityl (2,4,6-trimethylphenyl) and phenyl on C=O as ketene) | (structure: H₃C—O on C=C with two phenyls and H) | (3-alkoxycyclobutanone with mesityl, phenyl, H, H₃C—O, two phenyls) |
| 7 | (structure: biphenyl-C(=O)-biphenyl ketene) | (structure: H₃C—O—CH=CH₂) | (3-alkoxycyclobutanone with two biphenyl groups, H, H₃C—O, H, H) |
| 8 | (structure: H₃C—(CH₂)₁₆—H₂C—CH=C=O) | (structure: H₃C—O—CH=CH₂) | (3-alkoxycyclobutanone with H₃C—(CH₂)₁₆—H₂C, H, H₃C—O, H, H) |
| 9 | (cyclobutanone-derived ketene: H₂C—CH₂—H₂C—CH₂ ring with C=O) | (H₂C=CH—O—CH₃) | (spiro 3-alkoxycyclobutanone with cyclobutane ring, H₃C—O, H, H) |
| 10 | (cyclohexanone-derived ketene) | (H₂C=CH—O—CH₃) | (spiro 3-alkoxycyclobutanone with cyclohexane ring, H₃C—O, H, H) |
| 11 | (cyclohexanone-derived ketene) | (H₂C—O on C=C with cyclopropane ring (H₂C—CH₂—H₂C—CH₂)) | (spiro 3-alkoxycyclobutanone with cyclohexane and cyclobutane rings, H₃C—O, H) |
| 12 | (cyclopentanone-derived ketene: H₂C—CH₂—H₂C—CH₂ ring with C=O) | (H₂C—O on C=C with cyclobutane ring) | (spiro 3-alkoxycyclobutanone with cyclopentane and cyclobutane rings, H₃C—O, H) |

TABLE—Continued

| Item | A. Ketene | B. 1-Alkenyl Ether | C. 3-Alkoxycyclobutanone |
|---|---|---|---|
| 13 | (bis-cyclohexyl-S ketene) C=O | H₃C—H₂C—O—CH=CH—(cyclohexyl-S) | (corresponding 3-ethoxycyclobutanone) |
| 14 | (C₁₅H₃₇)₂C=O | H₃C—H₂C—O—CH=CH—(C₁₅H₃₇) | (corresponding 3-ethoxycyclobutanone) |
| 15 | (C₆H₅)₂C=O (diphenylketene) | H₃C—O—C(=CH—)(C₆H₅)₂ | (corresponding 3-methoxycyclobutanone) |
| 16 | (C₆H₅CH₂)₂C=O | H₃C—H₂C—O—C(=CH—)(CH₂C₆H₅)₂ | (corresponding 3-ethoxycyclobutanone) |
| 17 | H₂C=O (formaldehyde) | H₃C—H₂C—O—CH=C(p-CH₃-C₆H₄)₂ | (corresponding 3-ethoxycyclobutanone) |

| Item | D. Halide | E. 1-alkenyl-3-alkoxy-1-hydroxycyclobutane | F. 1-(1-alkenyl)bicyclo[1.1.0]butane |
|---|---|---|---|
| 1 | Br—C(CH₃)=CH₂ | (3-methoxy-1-(1-propenyl)-2,2,4,4-tetraethylcyclobutan-1-ol) | (corresponding bicyclobutane) |
| 2 | Br—CH=CH—CH₂—CH₃ | (3-ethoxy-1-(1-pentenyl) derivative with phenyl, methyl, ethyl substituents) | (corresponding bicyclobutane) |
| 3 | Br—C(CH₃)=CH—CH₃ | (3-methoxy-1-(1-propenyl) derivative with phenyl substituents) | (corresponding bicyclobutane) |

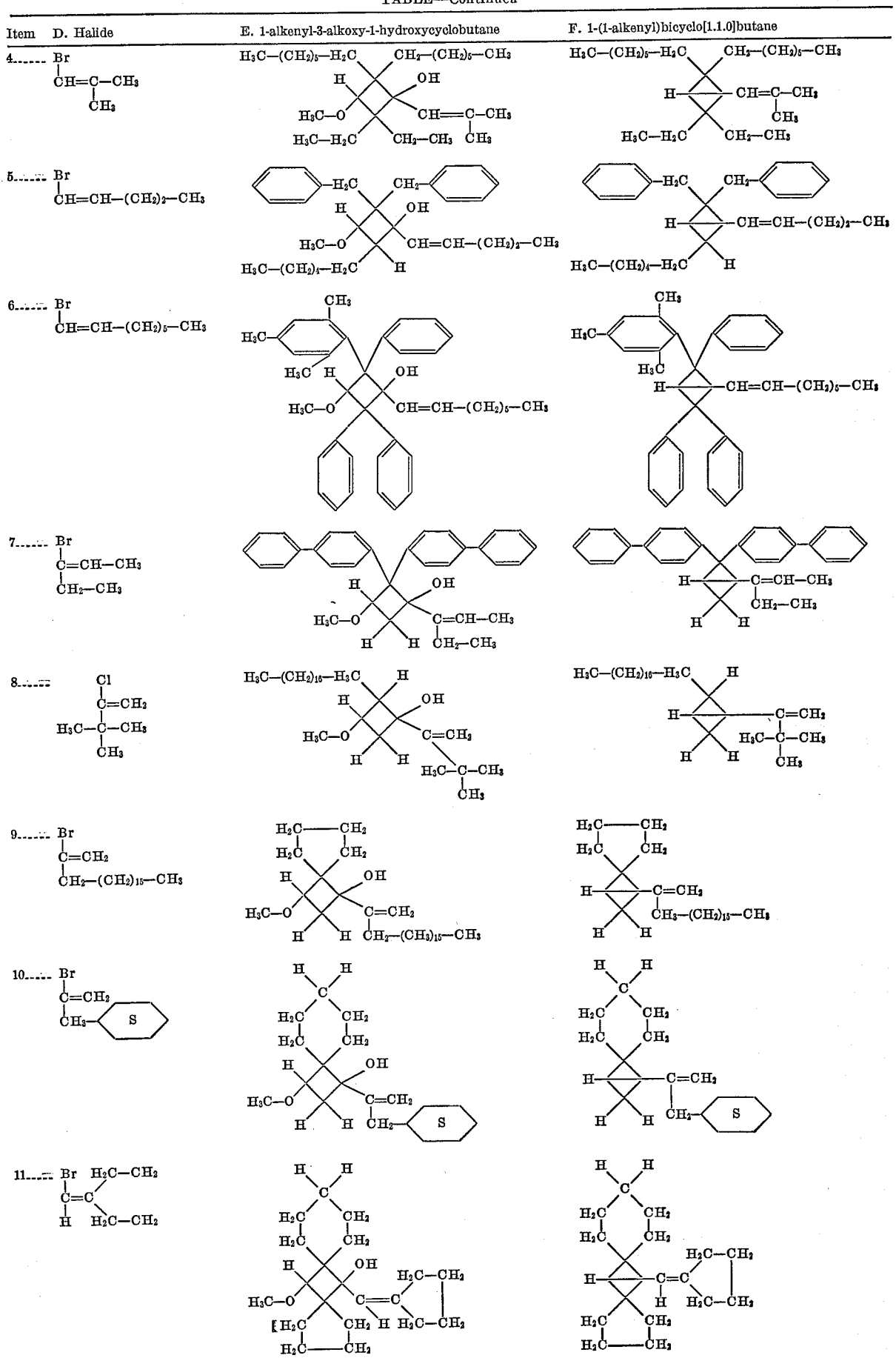

TABLE—Continued

| Item | D. Halide | E. 1-alkenyl-3-alkoxy-1-hydroxycyclobutane | F. 1-(1-alkenyl)bicyclo[1.1.0]butane |
|---|---|---|---|
| 12 | | | |
| 13 | | | |
| 14 | | | |
| 15 | | | |
| 16 | | | |
| 17 | | | |

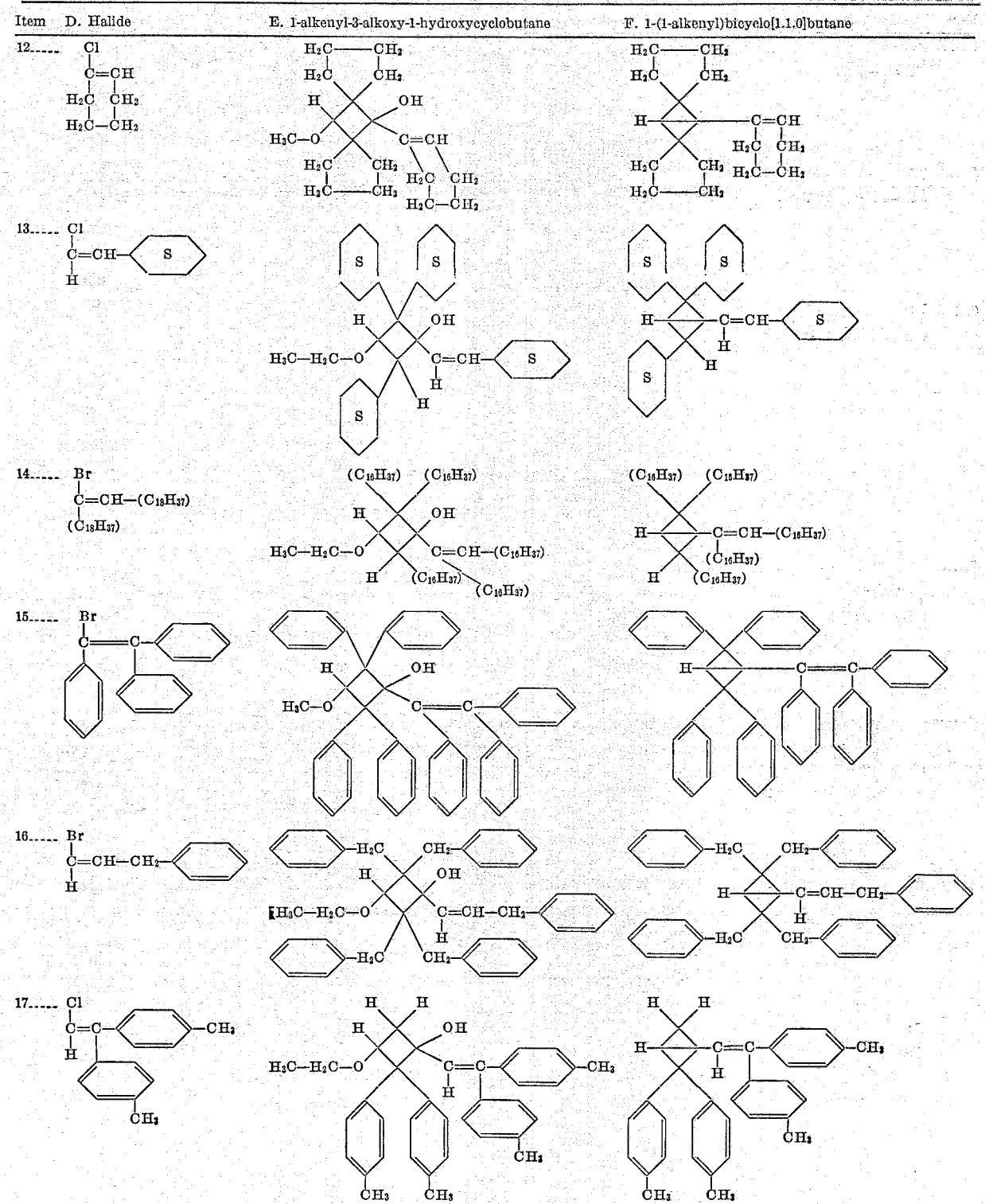

The embodiments of the invention in which an exclusive property or privilege is claimed are defined as follows:

1. 1-(1-alkenyl)bicyclo[1.1.0]butanes of the formula

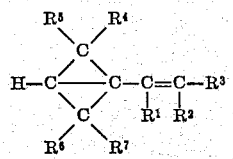

in which $R^1$, $R^2$, $R^3$, $R^4$, $R^5$, $R^6$ and $R^7$ are selected from the group consisting of hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals [—$(CH_2)_4$— or —$(CH_2)_5$—].

2. The compounds of claim 1 in which the hydrocarbyl groups contain 1–12 carbon atoms.

3. The compounds of claim 2 in which the hydrocarbyl groups contain 1–6 carbon atoms.

4. The compounds of claim 1 in which the hydrocarbyl groups are selected from the group consisting of methyl, ethyl, t-butyl, hexyl, isooctyl, dodecyl, octadecyl, cyclopropyl, cyclobutyl, cyclopentyl, cyclohexyl cyclooctyl, methylcyclohexyl, 3,5-dicyclohexylcyclohexyl, cyclooctadecyl, phenyl, naphthyl, anthryl, p-phenylphenyl, p-biphenylphenyl, naphthacenyl, benzanthryl, chrysenyl, p-tolyl, p-cumenyl, 2,4,6-tributylphenyl, 9,10-diethyl-1-anthryl, 6-methyl-2-naphthyl, benzyl, phenylethyl, diphenylmethyl, α-naphthylethyl, 2-(2-anthryl)ethyl, or 4-(2-anthryl)butyl.

5. The compound of claim 1 in which $R^1$, $R^2$, $R^3$, $R^4$, $R^5$, $R^6$ and $R^7$ are hydrogen; 1-vinylbicyclobutane.

6. A process for preparing the 1-(1-alkenyl)-bicyclo[1.1.0]butanes of claim 1 comprising:
    (1) contacting 3-alkoxycyclobutanone with a 1-alkenyl Grignard reagent under anhydrous conditions while dissolved in an inert organic solvent at about 0° C.–100° C. and adding aqueous mineral acid to the resulting reaction mixture to obtain the corresponding 1-alkenyl-3-alkoxy-1-hydroxycyclobutane;
    (2) contacting said 1-alkenyl - 3 - alkoxy - 1 - hydroxycyclobutane in an inert hydrocarbon solvent with an aqueous hydrogen halides selected from the group consisting of hydrogen chloride, hydrogen bromide and hydrogen iodide, at about 0° C.–50° C. to form a mixture of 1-alkenyl-3-alkoxy-1-halocyclobutane and 3-alkoxy-1 - (2 - haloalkenylidene)cyclobutane; and
    (3) contacting said 1-alkenyl-3-alkoxy - 1 - halocyclobutane and/or 3 - alkoxy - 1 - (2 - haloalkenylidene) cyclobutane at about 0° C.–100° C. with a metal capable of removing halogen to obtain the corresponding 1-(1-alkenyl)bicyclo[1.1.0]butane.

7. The process of claim 6 wherein the 3-alkoxycyclobutanone is contacted with the 1-alkenyl Grignard reagent at about 0° C.–50° C.

8. The process of claim 6 wherein the 1-alkenyl-3-alkoxy-1-hydroxycyclobutane is contacted with an excess of hydrogen halide at room temperature.

References Cited
UNITED STATES PATENTS

| | | | |
|---|---|---|---|
| 3,383,371 | 5/1968 | Natta | 260—79.5 |
| 3,520,941 | 7/1970 | Rifi | 260—666 Py |
| 3,523,928 | 8/1970 | Blanchard | 260—80 |

DELBERT E. GANTZ, Primary Examiner

V. O'KEEFE, Assistant Examiner

U.S. Cl. X.R.

260—85.5, 93.1

UNITED STATES PATENT OFFICE
CERTIFICATE OF CORRECTION

Patent No. 3,766,282    Dated October 16, 1963

Inventor(s) James B. Seija

It is certified that error appears in the above-identified patent and that said Letters Patent are hereby corrected as shown below:

Col. 1, line 51 - "1.1.4" should be "1.1.0".

Col. 3, line 36, formula V - "$R^8$" and "$R^6$" should be "$R^6$" and "$R^7$".

Col. 6, line 64 - insert hyphen after "chloro".

Col. 10C, item 6 - " 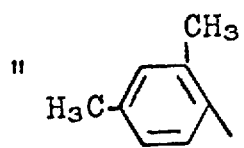 " should be " 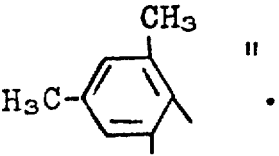 ".

Col. 9B, item 12 - "$H_2C$-O" should be "$H_3C$-O".

Col. 12C, item 14 - "$(C_{16}H_{37})$" should be "$(C_{18}H_{37})$" (three occurrences).

Col. 13D, item 10 - "  " should be "  ".

Col. 13D, item 11 - " 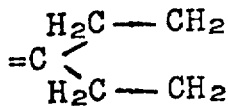 " should be " 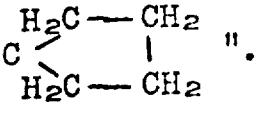 ".

Cols. 15-16, E & F, item 14 - "$(C_{16}H_{37})$" should be "$(C_{18}H_{37})$" (10 occurrences).

Col. 17, line 24 - "halides" should be "halide".

Signed and sealed this 9th day of April 1974.

(SEAL)
Attest:

EDWARD M. FLETCHER, JR.
Attesting Officer

C. MARSHALL DANN
Commissioner of Patents